United States Patent
Duncan

(10) Patent No.: US 7,443,567 B2
(45) Date of Patent: Oct. 28, 2008

(54) IMAGE ENHANCEMENT OF A MICRODISPLAY THROUGH ACOUSTOOPTICS

(75) Inventor: Walter M. Duncan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1 day.

(21) Appl. No.: 11/586,361

(22) Filed: Oct. 25, 2006

(65) Prior Publication Data

US 2008/0100901 A1    May 1, 2008

(51) Int. Cl.
*G02F 1/11*    (2006.01)
*G02F 1/33*    (2006.01)
(52) U.S. Cl. ...................... 359/285; 359/305
(58) Field of Classification Search ............... 359/285
See application file for complete search history.

(56) References Cited

U.S. PATENT DOCUMENTS

2002/0167647 A1* 11/2002 Numakoshi .............. 353/31

OTHER PUBLICATIONS

"Acousto-Optic Physical Principles—Main Equations"; AA Opto-Electronic; internet http://www.acoustooptic.com/acousto-optic-principles.html; 5 pages, May 24, 2006.

* cited by examiner

*Primary Examiner*—Jordan M. Schwartz
*Assistant Examiner*—James C Jones
(74) *Attorney, Agent, or Firm*—Wade J. Brady, III; Frederick J. Telecky, Jr.

(57) ABSTRACT

A method of processing light includes generating a beam of light and periodically diffracting the beam of light by an acoustooptic cell to produce diffracted light having at least one direction change from the generated light. The method further includes spatially integrating the diffracted light and providing the spatially integrated light to a spatial light modulator.

24 Claims, 2 Drawing Sheets

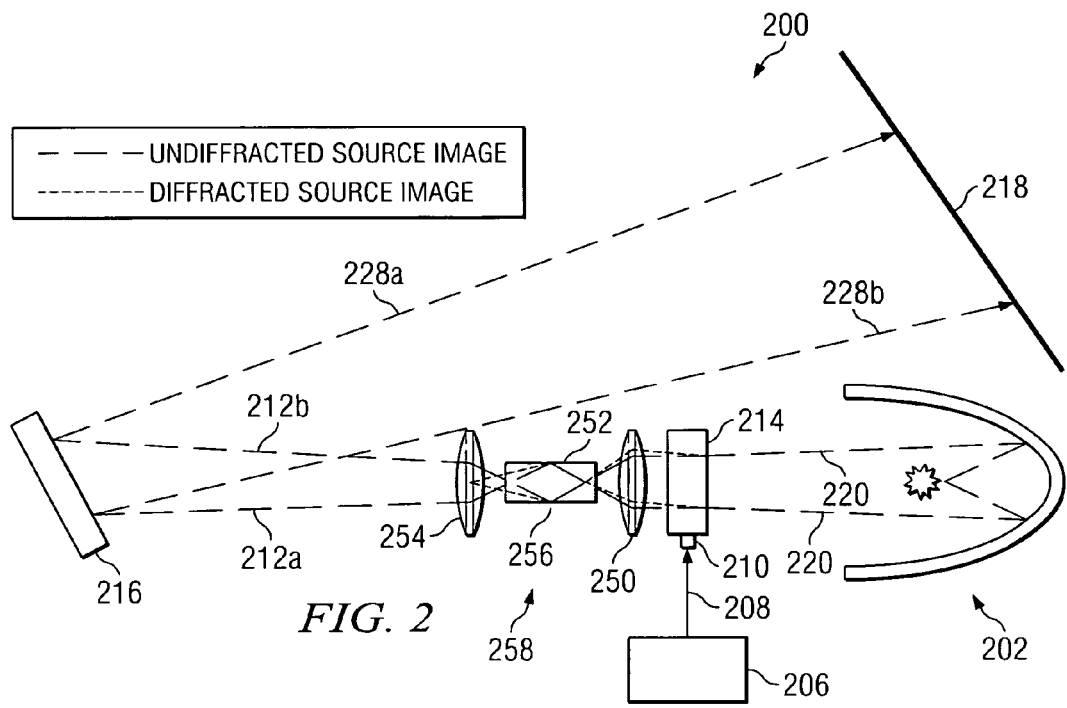
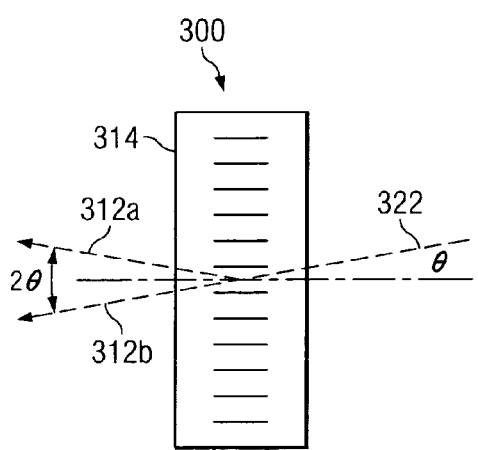
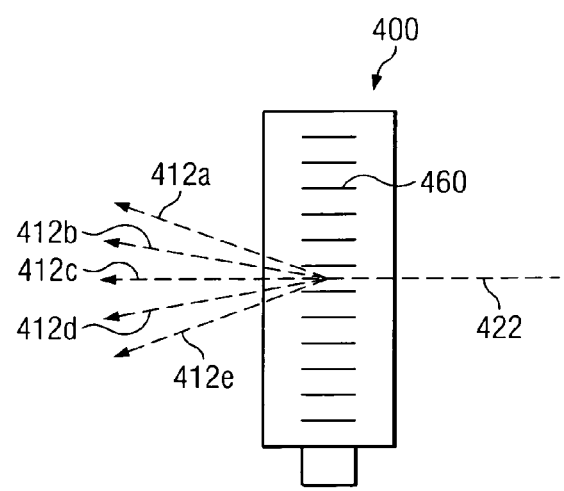

IMAGE ENHANCEMENT OF A MICRODISPLAY THROUGH ACOUSTOOPTICS

TECHNICAL FIELD

This invention relates in general to light processing systems and, in particular, to acoustooptic diffraction for image enhancement of a microdisplay.

BACKGROUND

When an acoustic wave propagates in a transparent material, it produces a periodic modulation of the index of refraction. This effect provides a moving phase grating that may diffract portions of an incident light beam into one or more directions. This phenomena is known as acoustooptic diffraction.

SUMMARY OF THE EXAMPLE EMBODIMENTS

In one embodiment, an apparatus for use with a light processing system includes a light source, an acoustooptic cell, a spatial light modulator, and a signal processor. The light source is capable of transmitting a beam of light. The acoustooptic cell is capable of diffracting the beam of light. The spatial light modulator comprises a plurality of pixel elements. Each pixel element is capable of selectively communicating light received, directly or indirectly, from the acoustooptic cell to produce a visual display. The signal processor is capable of providing the signal to the spatial light modulator.

In a method embodiment, a method of processing light includes generating a beam of light and periodically diffracting the beam of light by an acoustooptic cell to produce diffracted light having at least one direction change from the generated light. The method further includes spatially integrating the diffracted light and providing the spatially integrated light to a spatial light modulator.

In another method embodiment, a method of processing light includes generating a beam of light from a light source and periodically diffracting the beam of light by an acoustooptic cell to produce diffracted light having at least one directional change from the light source. The method further includes receiving the diffracted light at a spatial light modulator operable to selectively reflect light in response to receiving an image signal.

Technical advantages of some embodiments of the invention may include enhancing the pixel resolution associated with a light processing system. Other embodiments may be capable of improving the visual quality of a light processing system by mitigating light speckle.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which:

FIG. 2 is a block diagram of another embodiment of a portion of a display system according to the teachings of the invention; and FIGS. 3 and 4 are block diagrams illustrating methods of acoustooptically diffracting light that may be used in the systems of FIGS. 1A, 1B and 2.

DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular spatial light modulator device, such as, a digital micromirror device. Moreover, the illustrations in FIGS. 1 through 4 are not necessarily drawn to scale.

Figure 1A:
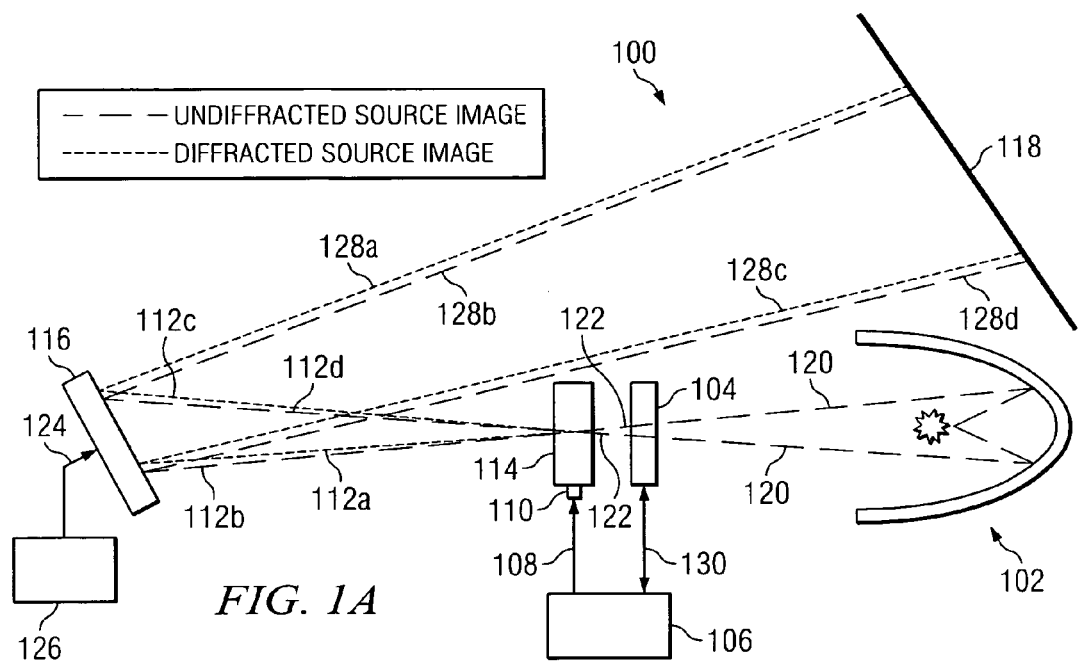
FIG. 1A is a block diagram of one embodiment of a portion of a display system.

FIG. 1A is a block diagram of one embodiment of a portion of a light processing system 100 according to the teachings of the invention. In general, light processing system 100 of FIG. 1A includes one or more light sources 102, an acoustooptic cell 114, and a spatial light modulator 116. As described in more detail below, acoustooptic cell 114 diffracts beams of light generated by light source 102 and provides diffracted light to spatial light modulator 116. Such diffraction may be useful in generating an image with increased resolution by rapidly shifting an image between two locations. This is often referred to by Texas Instruments Inc. as Smooth Picture. Such diffraction may also be used in reducing image "speckle" as described in greater detail in conjunction with FIGS. 2 through 4.

Light source 102 is capable of generating light beams 120. Although light processing system 100 is illustrated as including a single light source 102, light processing system 100 may include any suitable number of light sources appropriate for generating light beams. In this particular embodiment, light source 120 comprises an arc lamp; however, other embodiments may use other light sources, including lasers and light-emitting diodes, without departing from the scope of this disclosure In this particular embodiment, light beams 120 are directed from light source module 102 through a color wheel 104. In this embodiment, color wheel 104 comprises a spinning disc with a plurality of translucent panels. Each panel transmits specific frequencies of light corresponding to a specific color. The motion of color wheel 104 is determined by controller 106 through a control signal 130. Although this embodiment includes color wheel 104, other embodiments may eliminate color wheel 104. For example, in various embodiments, light source 102 may emit light beams at varying frequencies or wavelengths (different colors of light). In such embodiments, light from the different color beams may be cycled on and off representing a full color image.

In this embodiment, the frequency-selected light beams 122 are then directed to an acoustooptic cell 114. Acoustooptic cell 114 functions to diffract portions of incident light beams 122 into one or more directions in response to an acoustic wave. As the acoustic wave propagates through a suitable acoustooptic cell 114 crystal, it produces periodic modulation of the index of refraction that acts like a "phase grating" to produce one or more diffraction orders (e.g., as indicated by references 112a, 112c). A piezo-electric transducer 110, bonded to acoustooptic cell 114, provides the acoustic wave in response to a radiofrequency (RF) signal 108 provided by a controller 106. In this particular embodiment, RF signal 108 is a function of the frequency of light beams 122. Although FIG. 2 illustrates light beams passing through acoustooptic cell 114, various other embodiments may use a reflective acoustooptic device. In addition, various other embodiments may acoustooptically diffract light beams through an acoustooptic cell 114 at other stages along the optical path of the light beams. For example, in various other embodiments, an acoustooptic cell 114 may be positioned to diffract light received from a spatial light modulator 116. However, in this particular embodiment the diffracted light beams 112a, 112c, or alternatively, non-diffracted light 112b, 112d, are directed to a spatial light modulator 116.

Spatial light modulator 116 may comprise any device capable of selectively communicating at least some of the received light beams 112 along the projection light paths 128 in response to an image signal 124 provided by a signal processor 126. In various embodiments, spatial light modulator 116 may comprise, for example, a liquid crystal on silicon display. In the illustrated embodiment, however, spatial light modulator 116 comprises a digital micromirror device 116 (DMD).

Figure 1B:
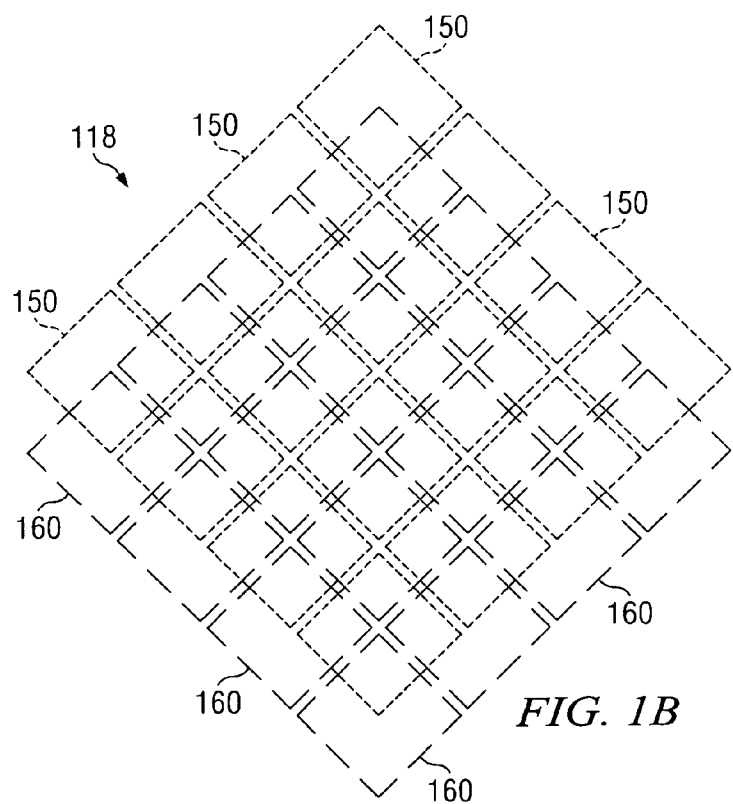
FIG. 1B is an illustration of a portion of the light displayed by the light processing system of FIG. 1A.

In this embodiment, proper synchronization of RF signal 108, image signal 124, and color wheel control signal 130 may enhance pixel resolution on a display surface 118. For example, FIG. 1B illustrates two distinct image patterns slightly offset from one another by periodic acoustooptic diffraction. Non-diffracted light beams (e.g., 112d) produce display pixels 160 of FIG. 1B for particular pixel elements of spatial light modulator 116, while periodically-diffracted light beams (e.g., 112c) produce display pixels 150 of FIG. 1B for the same pixel elements. In this embodiment, non-diffracted light beams (e.g., 112d) and diffracted light beams (e.g., 112c) are not concurrent, but rather switch back and forth rapidly as acoustooptic cell 114 periodically diffracts incident light beams 122. Thus, this particular embodiment alternatively generates two display pixels on display surface 118 for every pixel element of spatial light modulator 116. The result effectively doubles the visual resolution of light processing system 100, producing a visual effect similar to Smooth Picture utilized in many Texas Instruments Inc. display systems.

For conventional DMD light processing systems, images generated by light sources that produce coherent light, such as lasers, may create undesirable visual artifacts referred to herein as "speckling" or "image speckle." Speckling is caused, at least in part, by the scatter of coherent light from a diffuse surface, such as the surface topological features of a display screen. The speckling effect may be exacerbated by head motion, eye motion, screen roughness, light wavelength, and by the subjective eyesight of the observer. The teachings of some embodiments of the invention recognizes that acoustooptic diffraction, when combined with optical coupling, may effectively mitigate visual speckling without comprising light efficiency. Example embodiments are described in FIG. 2.

FIG. 2 is a block diagram of one embodiment of a portion of a light processing system 200 according to the teachings of the invention, which may be used to mitigate or even eliminate image speckle. In general, light processing system 200 of FIG. 2 includes one or more light sources 202, a piezo-electric transducer 210 bonded to acoustooptic cell 214, a controller 206, a spatial light modulator 116, and light integration system 258. In this embodiment, acoustooptic cell 214, piezo-electric transducer 210, controller 206, and spatial light modulator 116 are substantially similar in structure and function to respective components of FIG. 1A.

Light source 202 is capable of generating light beams 220. Although light processing system 200 is illustrated as including a single light source 202, light processing system 200 may include any suitable number of light sources appropriate for generating light beams. In this particular embodiment, light source 220 comprises a plurality of lasers capable of producing light in a variety of colors; however, other embodiments may use other light sources, including arc lamps and light-emitting diodes, without departing from the scope of the present disclosure. Various other embodiments that do not use a light source capable of producing colored light may include a color wheel substantially similar in position and function to color wheel 104 of FIG. 1A.

In this particular embodiment, acoustooptic cell 214 periodically diffracts incident light beams 220 from light source 202. Although acoustooptic cell 214 of FIG. 2 is transmissive, various other embodiments may use a reflective acoustooptic cell. The diffracted and non-diffracted light output from acoustooptic cell 214 then passes through a light integration system 258.

Light integration system 258 is capable of spatially integrating light beams received from acoustooptic cell 214 and focusing the spatially-integrated light onto spatial light modulator 216. In this particular embodiment, light integration system 258 includes a light integrator rod 252 positioned in the light path between an input lens 250 and an output lens 254. Although the use of discrete input lens 250 and output lens 254 is shown in FIG. 2, other lens, refractive and/or diffractive elements could be used to couple light into and out of an integrating device without departing from the scope of the present disclosure. The light integrator rod 252 is capable of internally reflecting light beams (e.g., reference point 256).

In this embodiment, the combined effects of rapid acoustooptic diffraction by acoustooptic cell 214 and internal reflection within integration system 258 redirect coherent light beams such that each pixel element of spatial light modulator 216 receives incident light beams 112 at various alternating angles. The rapid acoustooptic diffraction may insure a sufficient variety of angles to reduce or even cancel visual speckling, thereby dramatically improving the quality of the displayed image.

Although the embodiments described in FIG. 1A and FIG. 2 illustrate first order acoustooptic diffraction in the Bragg regime, other embodiments may use multi-order diffraction, such as in the Raman-Nath regime, without departing from the scope of the present disclosure. FIGS. 3 and 4 describe some differences between first order and multi-ordered diffraction as applied to the present disclosure.

FIG. 3 is a block diagram illustrating a portion of a light process system 300. The acoustooptic cell 314, in this particular embodiment, is similar in structure and function to acoustooptic cell 114 in FIG. 1A. In this embodiment, light paths 322 and 312 illustrate first-order light diffraction in the Bragg regime. That is, at one particular incidence angle $\theta_b$, only one diffraction order is produced—the others are annihilated by destructive interference. Diffraction in the Bragg regime may be used in embodiments seeking to improve resolution, as described in FIG. 1A, and for embodiments seeking to reduce image speckle, as described in FIG. 2.

FIG. 4 is a block diagram illustrating a portion of a light process system 400, which may be used to reduce speckling in other embodiments of the invention. The acoustooptic cell 414, in this particular embodiment, illustrates multi-order light diffraction in the Raman-Nath regime. In this particular embodiment, the incident light 422 is roughly normal to the acoustic beam and there are several diffraction orders 412a-412e. Embodiments utilizing diffraction in the Raman-Nath regime to reduce or eliminate speckling may include fewer components in a light integration system. For example, diffracted and non-diffracted light beams 412 may alternatively be coupled by a single lens that focuses the multi-vectored light beams onto a spatial light modulator similar in structure and function to spatial light modulator 116 of FIG. 1A.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A light processing system comprising:
   an acoustooptic cell capable of responding to a received waveform by alternating between transmitting diffracted light and non-diffracted light;
   a controller capable of generating the waveform;
   a spatial light modulator comprising a plurality of pixel elements, each pixel element capable of selectively communicating the diffracted light and the non-diffracted light; and
   wherein the acoustooptic cell and spatial light modulator are communicatively coupled such that a visual display is produced from the diffracted, selectively communicated light and from the non-diffracted, selectively communicated light.

2. The apparatus of claim 1, wherein the spatial light modulator is positioned to receive light diffracted by the acoustooptic cell.

3. The apparatus of claim 1, wherein the acoustooptic cell is positioned to receive light spatially modulated by the spatial light modulator.

4. The apparatus of claim 2, and further comprising a light-integration system positioned between the acoustooptic cell and the spatial light modulator, the light-integration system capable of producing spatially integrated light.

5. The apparatus of claim 4, wherein the light-integration system comprises a light integrator rod.

6. The apparatus of claim 4, wherein the light-integration system comprises one or more lens.

7. The apparatus of claim 1, wherein the spatial light modulator comprises a device selected from the group consisting of:
   a liquid crystal display device;
   a liquid crystal on silicon display device; and
   a digital micromirror device.

8. The apparatus of claim 1, wherein the acoustooptic cell is operable to produce one or more diffraction orders for the beam of light.

9. The apparatus of claim 1, wherein the acoustooptic cell is positioned in an image plane of the received light.

10. The apparatus of claim 1, wherein the acoustooptic cell is positioned outside any image plane of the received light.

11. A method of processing light comprising:
    generating a beam of light having a first frequency range;
    periodically diffracting the beam of light by an acoustooptic cell to produce diffracted light having the first frequency range and at least one directional change from the generated beam of light;
    periodically transmitting the beam of light by the acoustooptic cell to produce non-diffracted light having the first frequency range;
    spatially integrating the diffracted light and the non-diffracted light from the acoustooptic cell; and
    providing the spatially-integrated light to a spatial light modulator.

12. The method of claim 11, wherein diffracting the beam of light through an acoustooptic cell comprises generating at least one diffraction order.

13. The method of claim 11, wherein spatially integrating the diffracted light comprises internally reflecting the light inside an integrator rod.

14. The method of claim 11, wherein providing the spatially-integrated light comprises transmitting the light through at least one lens.

15. The method of claim 11, and further comprising filtering specific wavelengths of the beam of light prior to providing the spatially-integrated light to a spatial light modulator.

16. The method of claim 15, wherein filtering specific wavelengths of the beam of light comprises filtering specific wavelengths of the beam of light by a color wheel.

17. The method of claim 11, and further comprising modulating the intensity of the diffracted light by the acoustooptic cell.

18. The method of claim 11, and further comprising spatially-modulating the spatially-integrated light by the spatial light modulator to produce an image having a gray scale that is at least partially intensity-modulated by the acoustooptic cell.

19. A method of processing light comprising:
    generating a beam of light from a light source:
    periodically diffracting the beam of light by an acoustooptic cell to produce diffracted light having at least one directional change from the light source;
    periodically transmitting the beam of light by the acoustooptic cell to produce non-diffracted light having no directional change from the light source;
    receiving the periodically diffracted light and the periodically transmitted light at a spatial light modulator operable to selectively reflect light in response to receiving an image signal;
    selectively reflecting, by the spatial light modulator, the non-diffracted light and the diffracted light; and
    displaying a first display of the selectively reflected, non-diffracted light in alternation with a second display of the selectively reflected, diffracted light.

20. The method of claim 19, wherein generating a beam of light comprises generating a beam of light having a selected frequency.

21. The method of claim 20, wherein periodically diffracting the beam of light comprises periodically diffracting the beam of light as a function of the selected frequency.

22. The method of claim 19, wherein generating a beam of light from a light source comprises generating a beam of light from a device selected from the group consisting of:
    a laser;
    a light-emitting diode;
    a mercury lamp;
    a tungsten-halogen lamp; and
    an incandescent lamp.

23. The method of claim 19, wherein the first display and the second display are offset from each other.

24. The method of claim 19, wherein the first display and the second display are offset from each other, the offset less than a width of a pixel of the first display.

* * * * *